(12) United States Patent
Kubik et al.

(10) Patent No.: US 7,270,775 B2
(45) Date of Patent: *Sep. 18, 2007

(54) CORROSION INHIBITING COMPOSITION AND ARTICLE CONTAINING IT

(75) Inventors: Donald Alfons Kubik, Dickenson, ND (US); Boris Varshal, Lynn, MA (US); Efim Ya Lyublinski, Mayfield Heights, OH (US); Barbara Ann Nygaard, Circle Pines, MN (US)

(73) Assignee: Northern Technologies International Corp., Beachwood, OH (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/676,752

(22) Filed: Oct. 1, 2003

(65) Prior Publication Data
US 2004/0069972 A1    Apr. 15, 2004

Related U.S. Application Data

(63) Continuation-in-part of application No. 10/453,304, filed on Jun. 3, 2003, now abandoned, which is a continuation of application No. 10/054,031, filed on Jan. 22, 2002, now abandoned.

(51) Int. Cl.
*C08K 3/00* (2006.01)
*C09K 3/00* (2006.01)
*C23F 11/00* (2006.01)

(52) U.S. Cl. .............. 252/389.3; 252/389.52; 252/389.62; 524/430; 524/442; 524/323; 524/351; 524/352

(58) Field of Classification Search ........ 524/430, 524/442, 323, 351, 352; 252/389.3, 389.52, 252/389.62
See application file for complete search history.

(56) References Cited

U.S. PATENT DOCUMENTS

| | | | |
|---|---|---|---|
| 2,629,649 A | 2/1953 | Wachter et al. | |
| 2,711,360 A | 6/1955 | Wachter et al. | |
| 2,717,843 A | 9/1955 | Wachter et al. | |
| 2,739,871 A | 3/1956 | Senkus | |
| 2,829,080 A | 4/1958 | Fessler et al. | |
| 2,986,447 A | 5/1961 | Raifsnider | |
| 3,080,211 A | 3/1963 | Fessler et al. | |
| 3,110,684 A | 11/1963 | Miller | |
| 3,304,267 A | 2/1967 | Miller | |
| 3,354,117 A * | 11/1967 | Schmidt | 524/304 |
| 3,398,095 A | 8/1968 | Judd | |
| 3,433,577 A | 3/1969 | Shick | |
| 3,626,083 A | 12/1971 | Minter | |
| 3,785,975 A | 1/1974 | Humphrey | |
| 3,967,926 A | 7/1976 | Rozenfeld et al. | |
| 4,051,066 A | 9/1977 | Miksic et al. | |
| 4,098,720 A | 7/1978 | Hwa | |
| 4,119,604 A * | 10/1978 | Wysong | 524/377 |
| 4,217,216 A | 8/1980 | Lipinski | |
| 4,290,912 A * | 9/1981 | Boerwinkle et al. | 252/389.3 |
| 4,626,283 A | 12/1986 | Martins et al. | |
| 4,782,106 A | 11/1988 | Fricke et al. | |
| 4,891,404 A | 1/1990 | Narayan et al. | |
| 4,944,916 A | 7/1990 | Franey | |
| 4,973,446 A | 11/1990 | Bernhard et al. | |
| 4,973,448 A | 11/1990 | Carlson et al. | |
| 4,983,661 A | 1/1991 | Ali et al. | |
| 5,037,708 A | 8/1991 | Davitz | |
| 5,139,700 A | 8/1992 | Miksic et al. | |
| 5,154,886 A | 10/1992 | Franey et al. | |
| 5,180,762 A | 1/1993 | Canova | |
| 5,209,869 A | 5/1993 | Miksic et al. | |
| 5,320,778 A | 6/1994 | Miksic et al. | |
| 5,324,448 A | 6/1994 | Mayeaux | |
| 5,344,589 A | 9/1994 | Miksic et al. | |
| 5,462,983 A | 10/1995 | Bloembergen et al. | |
| 5,500,465 A | 3/1996 | Krishnan et al. | |
| 5,593,624 A | 1/1997 | Lewis | |
| 5,715,945 A | 2/1998 | Chandler | |
| 5,801,224 A | 9/1998 | Narayan et al. | |
| 5,817,195 A | 10/1998 | Davitz | |

(Continued)

FOREIGN PATENT DOCUMENTS

EP    0 366 305    5/1990

(Continued)

*Primary Examiner*—Cephia D. Toomer
(74) *Attorney, Agent, or Firm*—Hudak, Shunk & Farine Co. LPA

(57) ABSTRACT

An effective corrosion inhibiting polymer composition including an interceptor for an acid gas combined with known VCI ingredients produces a more effective VCI than the prior art composition. The composition in macrogranular form may be held in a receptacle which is sealed in a container in which ferrous articles are protected. When the composition, greatly diluted is injection- or blow-molded or extruded as film which contains more than 100 ppm of a 2,4-6-tri-substituted phenol and uniformly dispersed small amounts of solid micron-sized particles of interceptor, an alkali metal nitrite and a solid adjuvant to aid in dispersing the solid particles, the film is transparent and has a smooth surface. All solid particles in the material have a primary particle size smaller than 53 μm which makes it possible to obtain the uniform dispersion, transparency and smooth surfaces of an article such as film in which a ferrous metal object is wrapped prior to shipment; or, a capsule which is filled with the VCIs and placed with ferrous metal objects in a sealed container.

37 Claims, No Drawings

U.S. PATENT DOCUMENTS

| | | | |
|---|---|---|---|
| 5,817,721 A | 10/1998 | Warzelhan et al. |
| 5,855,975 A | 1/1999 | Miksic et al. |
| 5,871,668 A | 2/1999 | Heimann et al. |
| 5,880,078 A | 3/1999 | Bevilacqua, Jr. et al. |
| 5,882,441 A | 3/1999 | Davitz |
| 5,906,783 A | 5/1999 | Narayan et al. |
| 5,916,372 A | 6/1999 | Bevilacqua, Jr. et al. |
| 5,928,796 A | 7/1999 | Heimann et al. |
| 5,938,976 A | 8/1999 | Heimann et al. |
| 5,958,115 A | 9/1999 | Böttcher et al. |
| 5,969,089 A | 10/1999 | Narayan |
| 5,983,598 A | 11/1999 | Quinones |
| 6,010,984 A | 1/2000 | Heimann et al. |
| 6,010,985 A | 1/2000 | Heimann et al. |
| 6,017,857 A | 1/2000 | Heimann et al. |
| 6,028,160 A | 2/2000 | Chandler et al. |
| 6,054,512 A | 4/2000 | Nelson et al. |
| 6,080,334 A | 6/2000 | Heimann et al. |
| 6,139,652 A | 10/2000 | Carrano et al. |
| 6,156,929 A | 12/2000 | Chandler et al. |
| 6,165,284 A | 12/2000 | Shubkin |
| 6,190,779 B1 | 2/2001 | Heimann et al. |
| 6,201,034 B1 | 3/2001 | Warzelhan et al. |
| 6,224,957 B1 | 5/2001 | Crook et al. |
| 6,242,371 B1 | 6/2001 | Quinones |
| 6,316,392 B1 | 11/2001 | Heimann et al. |
| 6,321,907 B1 | 11/2001 | Honstrater |
| 6,331,509 B1 | 12/2001 | Heimann et al. |
| 6,414,108 B1 | 7/2002 | Warzelhan et al. |
| 2003/0031583 A1 | 2/2003 | Reinhard |
| 2003/0220436 A1 | 11/2003 | Gencer |
| 2004/0063837 A1 | 4/2004 | Kubik et al. |
| 2004/0248486 A1 | 12/2004 | Hodson |
| 2005/0182196 A1 | 8/2005 | Khemani et al. |

FOREIGN PATENT DOCUMENTS

| | | |
|---|---|---|
| HU | 48857 | 7/1989 |
| WO | 02/27069 | 4/2002 |
| WO | 03/060197 | 7/2003 |
| WO | 03/062313 | 7/2003 |
| WO | 03/062346 | 7/2003 |

\* cited by examiner

CORROSION INHIBITING COMPOSITION AND ARTICLE CONTAINING IT

CROSS-REFERENCE TO RELATED APPLICATIONS:

This application is a continuation-in-part application of Ser. No. 10/453,304 filed 3 Jun. 2003 now abandoned, which is a continuation of Ser. No. 10/054,031 filed 22 Jan. 2002 now abandoned.

FIELD

This invention relates to a combination of vapor phase inhibiting ("VPI") ingredients or more preferably, of volatile corrosion inhibiting ("VCI") ingredients in a polymeric article of arbitrary shape and cross-section. The article is typically a synthetic resinous (hereafter also "plastic") box-like container, film or capsule, such as is used to protect metal objects packaged for storage and transportation. Ferrous metal objects are commonly packaged in either a polyolefinic ("PO") bag, typically polyethylene ("PE"), or container of PO film; or, in a relatively large sealed container into which a corrosion-inhibiting capsule is inserted. Dispersed in the film, as an integral part thereof, is an effective combination of corrosion inhibiting compounds referred to as VCIs; alternatively, the VCIs are dispersed in chunks or pellets of polymer, the pellets being small enough to be confined in the capsule which has gas-permeable walls. The term "capsule" refers to a sealed receptacle having at least one wall through which vapors of VCIs may permeate into a molecular oxygen-containing atmosphere surrounding the capsule. The effectiveness of protection accorded is necessarily attributed to the combined vapor pressure exerted by the VCIs which provide the corrosion protection without the VCI compounds themselves directly contacting the metal surfaces being protected and the plastic being generally spaced apart from the surface; vapor permeates through the plastic in which the VCIs are dispersed and inhibits corrosion of ferrous metal held in a sealed space.

Box-like containers and synthetic resinous film, e.g. biodegradable polyester film of low density polyethylene ("LDPE") and polypropylene ("PP") are most commonly used to package metal objects, the biodegradable film often being used to protect farm machinery. However, ferrous metals are susceptible to corrosion due to atmospheric gases including moisture, oxygen, acidic gases such as sulfur dioxide, oxides of nitrogen and the like, to which gases the synthetic film is relatively permeable. A large proportion of such ferrous metal objects, for one reason or the other, cannot be coated with a visible protective coating such as a paint, a paste or a gel, yet must be shipped or otherwise delivered after a long time, at least one year, looking as if they had been freshly manufactured. Moreover, packaging film is required to be transparent to enable one to inspect film-packaged clean, rust-free surfaces. Oxidizing agents, though present in small amounts in the atmosphere have been found to be so damaging over such a long time that the expense of packaging clean ferrous metal articles in a VCI-containing polymer film ("VCI-film") is justified. Because such oxidizing agents typically damage the film, it is routinely protected with an antioxidant such as a 2,4,6-tri-substituted phenol, but in a relatively low concentration, typically less than 100 ppm, to scavenge free radicals generated by oxygen atoms entering the film; water molecules trapped in plastic film do not generate such free radicals. For protection against rust, a large number of rust-inhibiting alkaline metal salts are known to be effective when directly coated onto a ferrous surface.

The Problem

The problem is to find a salt which is effective without being coated, that is, one which functions acceptably as a VCI; alternatively, to improve on a salt known to function as such, which improved salt(s) when incorporated into essentially transparent packaging film in an amount sufficient to provide protection against corrosion for at least one year, does not visibly decrease the transparency of the material or embrittle the film. By "transparent" is meant that the VCI-film is to have substantially the same permeability to visible light as film which does not contain the VCIs. Such transparency allows one to read this text in 12 point font with a piece of film laid over the text. The term "film" refers to polymer having a wall thickness sufficient to have substantially uniformly dispersed within it, the VCI and other ingredients. By a film which functions acceptably is meant that enough VCI and other ingredients are included to provide protection in a defined environment for a predetermined period. Further, the film is to have smooth surfaces and a thickness which is substantially uniform, that is, its surfaces are smooth to the touch; such smooth film typically has a variance of less than a ±0.0125 mm (0.5 mil or 0.0025") in the thickness of the film, when the thickness is in the range from about 0.025 mm (1 mil or 0.001") to 0.125 mm (5 mils or 0.005") thick; when such variances are due to particles of solid, or clumps of particles, at or near the surfaces of the film, the film is not smooth to the touch.

BACKGROUND OF THE INVENTION

A large variety of organic corrosion inhibiting compounds such as N-nitrosamine and/or benzol have been embedded or otherwise confined in packaging materials, more particularly in sheet stock made from paper or other cellulosic materials, or from a polymer of an olefin containing from 2 to 8 carbon atoms. Such compounds function as VCIs without directly contacting the surface of the metal being protected, except to the extent that particles of a VCI at the surface of a wrap or sheet of packaging material contact the surface of the object packaged. A VCI is a "noncontact inhibitor". Therefore, the effectiveness of a VCI is necessarily predicated upon its ability to provide protection against corrosion without contacting surfaces to be protected, for example, even if the object to be protected is suspended in a sealed space provided by packaging material containing the VCI, as demonstrated by a test described herebelow.

Unlike VCIs, rust-inhibiting inorganic alkaline salts have long been used to combat corrosion, as for example in U.S. Pat. No. 3,110,684 which discloses a combination of from 30% to 50% by weight of the alkaline salt, with 30% to 50% by weight of a sequestering or chelating agent, and 10% to 30% by weight of a preservative agent. Examples of the alkaline salt include sodium silicate, sodium nitrite, sodium nitrate, sodium chromate, sodium chlorate, or sodium carbonate, or potassium silicate, potassium nitrite, potassium nitrate, etc. or lithium silicate, etc.; examples of a sequestering or chelating agent include a sodium salt of phosphoric acid, such as tetrasodium pyrophosphate, sodium citrate or sodium gluconate, a potassium salt of phosphoric acid, potassium citrate, etc., or an ammonium salt of phosphoric acid, ammonium citrate, etc., citric acid or gluconic acid or ethylene diamine tetra acetic acid; examples of a sequestering agent include sodium benzoate, ammonium benzoate or lithium benzoate.

U.S. Pat. No. 3,304,267 teaches a combination of from 75-85% by weight of a rust inhibiting alkaline salt, 5-15% by weight of sodium metasilicate, and from 5 to 15% by weight of a non-ionic organic dispersant compressed and molded into a solid which operates as a corrosion inhibitor only when water is present. Hungarian Patent HU 48857 teaches using an aqueous paste of perlite, bentonite containing sodium silicate and/or sodium phosphate as active ingredients, which paste is plastic enough to be pressed into holes in steel used to reinforce concrete. However, such inorganic materials, with the exception of sodium nitrite have not been suggested for use as VCIs because of their much lower vapor pressure compared to that exerted by corrosion inhibiting organic compounds. Additional problems with respect to using other inorganic compounds include the difficulty of grinding or otherwise comminuting them to a sufficiently small particle size so as to be rendered essentially invisible when dispersed in transparent film; of dispersing them uniformly in the film because of their proclivity to clump; and, of extruding film with surfaces smooth to the touch, because of the proclivity of the particles to come to the surfaces of the film.

With the foregoing in mind, U.S. Pat. No. 4,290,912 issued to Boerwinkle et al, about two decades ago, disclosed that an inorganic nitrite, e.g. potassium nitrite, sodium nitrite and calcium nitrite, in combination with a 2,4,6-trisubstituted phenol provided a VCI combination in a lower PO polymer. Neither potassium nitrite nor calcium nitrite is a usable VCI since they are too hygroscopic. A specific '912 combination comprised about equal parts (1.485 phr each) by weight of sodium nitrite and a 2,4,6-tri-substituted phenol containing 9 to 24 carbon atoms, specifically 2,6-di-tert-butyl-4-methyl phenol, along with small amounts of one or more inert ingredients such as fumed silica and oleyl alcohol which are known to possess no anti-corrosive properties. As of this time, sodium nitrite is the only usable VCI found to be effective with the 2,4,6-tri-substituted phenol. Effectiveness of the '912 film was unconcerned with the primary particle size of the sodium nitrite because the '912 patent did not address the problems (i) of embrittlement, (ii) of maintaining transparency and/or uniform thickness of extruded film having smooth surfaces, or (iii) of protection against sulfur dioxide, or the ability to tailor the thickness of film to provide protection for a predetermined period under expected unfavorable storage conditions.

The newly discovered effectiveness of sodium silicate and/or zinc oxide in combination with the '912 VCI combination of active ingredients was unexpected because there is no reason to believe that either the stable essentially anhydrous silicate or amphoteric zinc oxide, when combined with a non-hydrolyzable polymer having a WVTR at least as high as that of LDPE, might interact with an acid gas such as sulfur dioxide, present in an amount in the range from about 10 ppm to 100 ppm, to function predominantly as an interceptor; and, in combination with sodium nitrite and the 2,4,6-tri-substituted phenol function as a VCI; further, neither the silicate nor the zinc oxide, by itself, has any discernible anti-corrosive activity as a VCI; still further, the WVTR (water vapor transmission rate) of the novel film which contains the interceptor, whether zinc oxide or silicate of sodium, or both, in addition to the '912 ingredients, after about 24 hr, is essentially the same as that of the plain PE film with no VCI ingredients (as shown in Table I below), or of the '912 film.

Since a lower WVTR with polymer containing the interceptor, would appear to provide a theoretical basis upon which to expect better corrosion protection, no decrease in the WVTR provided a reasonable basis not to use one or more of the interceptors as an essential ingredient of the VCI combination. By "essentially non-hydrolyzable" is meant that the polymer is not hydrolyzed more than 5% under conditions at which an object to be protected is stored while exposed to the VCI ingredients in a sealed environment.

SUMMARY OF THE INVENTION

It has been discovered that an interceptor, whether zinc oxide or a silicate of an alkali metal, preferably sodium, interacts with sodium nitrite and a 2,4,6-tri-substituted phenol when combined with a substantially non-hydrolyzable synthetic resinous film of substrate polymer, to provide effective VCI protection against corrosion of ferrous metal surfaces; further, when essentially anhydrous sodium nitrite is incorporated in a substrate synthetic resinous film having a relatively high WVTR, at least as high as that of LDPE, sufficient water molecules are trapped in the resin to allow moistened silicate to react with sulfur dioxide and/or zinc oxide and the sodium nitrite. When a finely divided interceptor is homogeneously dispersed in a critically small amount, from 0.01 to 2% by weight of the film, preferably in the range from 0.01 to 1%, within the substrate film, and combined with the '912 VCI ingredients, namely sodium nitrite and a 2,4,6-tri-substituted phenol, each in an amount from 0.01 to 2%, preferably from 0.05 to 1%, respectively, and also combined with an inert adjuvant in amount in the range from 0.01 to 1%, the effectiveness of the novel combination is unexpectedly improved relative to that of the '912 VCI combination.

By "inert adjuvant" is meant an agent added in an amount preferably less than 0.5% by weight of the recipe of active VCI ingredients and polymer, to aid or modify their effect or their dispersability in the polymer, or stability, without chemically reacting with the ingredients. Though finely divided solid particles may be directly dispersed in a polymer, they are not homogeneously dispersed unless sufficiently "wetted" by the molten polymer. To do this, it is preferable, first to distribute the particles in a first polymer which wets the particles sufficiently to have them homogeneously distributed in the first polymer, thus forming a concentrate. The concentrate is preferably comminuted and macrogranules of the concentrate are then mixed with a second polymer to form a thermoformable mixture which is extruded, or injection- or blow-molded. A typical adjuvant may be chosen from one or more of the following: an emulsifier, perfume, coloring dye, surfactant, processing aid, bactericide, opacifier and the like. An opacifier may be added if the film is required deliberately to hide the stored material from view. Substituting a small quantity of an oxide of another metal, or alkaline earth metal, for a portion of an interceptor does not improve the protection afforded by the interceptor at the same concentration.

The same active ingredients, dispersed in concentrate in macrogranular form, for example, pellets having an average diameter in the range from about 0.5 mm to 5 mm, may be confined in a receptacle, such as a hollow capsule, which is then placed in a sealed container in which articles are to be protected, access to its (container's) interior being only through its walls.

The combination of essentially anhydrous VCI ingredients in combination with an interceptor is not only effective against an acid gas and moisture but exhibits unexpected VCI activity without any evident reason for so doing. Neither interceptor is known to have any VCI activity, per se; yet each is shown to be more effective than the same combination of active '912 ingredients without the interceptor; this is confirmed in a qualitative comparison carried out in sealed jars ("jar tests") where the surfaces of specimens are compared visually; this is more rigorously confirmed in a chamber with a controlled aggressive atmosphere ("chamber tests") at different conditions, to wit: either cycled over a period of at least thirty (30) days, or, tested until a control sample fails. If the jar tests had indicated no visual difference between the metal samples tested for the effect of the VCIs, with and without the interceptor, the chamber tests alone would be dispositive. Since, as shown below, both the jar tests and the chamber tests indicated clearly superior corrosion protection of a sample exposed to the combination of an interceptor with the '912 ingredients, the evidence of the unexpected effect of the interceptor is established.

Moreover, the WVTR of the novel film during the first 24 hr is reduced because the interceptor scavenges sulfur dioxide and water vapor entering the film or container, in a way the film containing the '912 combination of ingredients cannot duplicate because of the absence of the interceptor. Though, after 68 hr, the WVTR of the novel film approaches that of plain polymer of the same thickness, the novel film provides protection against corrosion of ferrous metal which protection is unexpectedly superior to that provided by film containing the '912 combination of ingredients. Because, in combination with the sodium nitrite and trisubstituted phenol the interceptor has enhanced VCI activity, the interceptor is also referred to herein as a VCI ingredient. Protection of the novel film, 0.0875 mm (3.5 mil) thick with ingredients in concentrations shown below, lasts for at least a year, and will last longer depending upon the thickness of the film and the concentration of the VCIs in the film. Eventually, after the initial 24 hr period, when the film reaches equilibrium, the WVTR reverts to the value of VCI-free film.

The primary particle size as well as the amount of the sodium nitrite and the interceptor, each present as powder in the polymer, are critical because the finished polymer is to be substantially light permeable, that is, essentially transparent, unless deliberately required not to be. Transparency, without substantially embrittling the film, additionally requires that the powders be substantially homogeneously dispersed, each active ingredient in an amount stated above for the finished article or film, a limitation which can only be met when, with the exception of the 2,4,6-tri-substituted phenol, each powder ingredient remains in the solid state after the film or other substrate is thermoformed. The primary particle size of each salt, silicate and nitrite, is smaller than 53 µm (micrometer; No. 270 Standard Test Sieves- wire mesh), preferably in the range from about 1 µm to 45 µm (No. 325); and further, the powder is preferably uniformly dispersed with an inorganic adjuvant powder having a particle size in the same range, or smaller, functioning as a dispersant, optionally in combination with a surfactant.

Though substantially homogeneously dispersed, the finely divided interceptor is present in so small an amount that the initial decrease in the WVTR of PE-VCI film is short-lived. This very small amount of interceptor nevertheless provides unexpectedly better protection and resistance against corrosion than the interceptor-free '912 PE film, the remaining ingredients being present in the same concentration and the thickness of each film being identical; and the protection is provided without substantially affecting the physical properties of VCI-free film of the same thickness.

A ferrous metal object may now be protected against corrosion for a chosen period, typically up to four or more years, by the simple steps of placing it in a container having walls in which the VCI ingredients are dispersed, and sealing the container. The period over which protection is to be provided is determined by the walls having the appropriate higher concentration for longer time, or greater thickness at a lower concentration. The thickness is necessarily sufficient to have a smooth surface when a chosen concentration of active ingredients is substantially uniformly dispersed within the film; and the concentration of active ingredients is preferably sufficient to allow them to permeate through the film to its surfaces, as those active ingredients are exhausted from the surfaces.

DETAILED DESCRIPTION OF PREFERRED EMBODIMENTS

When a ferrous metal surface is exposed to the foregoing VCI ingredients including an interceptor dispersed in a polymer, they provide a corrosion inhibiting composition which effectively protects the ferrous metal surface against corrosion in a molecular oxygen-containing atmosphere containing in the range from 1 to 100 ppm of an acid gas at a 90% RH and 37.4° C. (100° F.), for at least one year. To obtain optimum dispersion of the ingredients in a finished article of non-biodegradable polymer, a concentrate is preferably first formed. The concentrate consists essentially of a non-hydrolyzable synthetic resinous polymer having dispersed therein from 10 to about 40 parts of an interceptor selected from the group consisting of an alkali metal silicate and zinc oxide; from 10 to 40 parts of sodium nitrite; and from 10 to 40 parts of a 2,4,6-tri-substituted phenol having a 4-substituent selected from a substitutable methylene carbon and a substitutable amine; in combination with an adjuvant, typically fumed silica or calcium carbonate, present in less than 5 parts, preferably 0.01 to 5 parts, provided that the polymer has a water vapor transmission rate (WVTR) at least as high as that of LDPE, and is present in an amount of at least 40 parts in 100 parts of the concentrate. The small particles of ingredients may be directly dispersed in the polymer powder, and if thoroughly dispersed, will result in a finished article in which the particles are substantially homogeneously dispersed, but the higher the concentration of particles, the more difficult it is to disperse them uniformly.

In addition to being formulated from a concentrate, whether the same polymer or different, biodegradable polymers are also generally able to have the particulate solids quite thoroughly dispersed in the finished article without first making a concentrate.

The combination of VCI ingredients including an interceptor may be used in a thermoformable synthetic resinous film or in a capsule, either of which is derived from an essentially non-hydrolyzable polymer which either is not biodegradable or compostable, or, an essentially non-hydrolyzable polyester which is. By "biodegradable" is meant that degradation results from naturally occurring microorganisms; by "compostable" is meant that the polymer meets or exceeds ISO and ASTM standards for both biodegradability and compostability. The thickness of film is typically limited to 0.20 mm (0.008" or 8 mils) because it is generally unnecessary to include a larger amount of VCI ingredients in the VCI-film (that is, if used at the preferred concentrations which provide the appropriate protection); and, because uniformity of dispersion in the preferred range of concentration is difficult to control in thicker cross-sections.

"Film" which provides protection for four years is typically no more than 0.20 mm (8 mils) thick, and such film may be thermoformed into a container with relatively rigid walls. Where protection is required for more than four years, or, extreme protection against water vapor is demanded and WVTR is an overriding criterion; or, when structural rigidity is a primary concern; or, if strength and damage due to tearing are key considerations, the "film" may be as thick as 1.25 mm (50 mils). Therefore, the term "film" as used herein, refers to an article having a wall with a cross-section in the range from about 0.025 mm (1 mil or 0.001") to 1.25 mm (50 mil or 0.05") thick. Though, inevitably a substantial portion of the combination of VCIs is present at or near the surface of the film, it is essential that the major portion of the VCIs be held within the film. This distribution ensures that when the VCIs at or near the surface are exhausted, even if in a relatively short period of a month or so, the effectiveness of the VCIs endures for a much longer time, at least one year, and with controlled thickness, up to ten years.

By "uniformity of dispersion" is meant that the uniformity of dispersed particles in the film may be quantified by known microscopic techniques, or by a blown film test. In the blown film test, the polymer containing solid powder particles is extruded through a blown film apparatus which produces a film about 0.025 mm (1 mil) thick, and this film is placed over a light source of appropriate wavelength and intensity to enable one to quantify the number of particles which show up as "imperfections"; and the size of each is also visible under appropriate magnification.

By "silicate of sodium" reference is made to essentially anhydrous sodium orthosilicate, sodium metasilicate, sodium disilicate, sodium trisilicate, and the like in crystalline and/or glassy states. Most preferred is powdered sodium disilicate having a weight ratio of silica to sodium oxide of 2, such as is commercially available from PQ Corporation. Though silicates of other alkali metals are usable, they are less preferred either because they are too hygroscopic, are difficult to grind into a powder with particles in the desired size range, or inadequate effectiveness as an interceptor. The function of zinc oxide is unexpected because it is deemed substantially inert to sulfur dioxide, yet functions as an interceptor, evidently without chemically reacting with the sulfur dioxide.

Light-permeable films of numerous thermoplastic and biodegradable polymers may be used as the substrate within which the VCIs are dispersed, such polymers including LDPE, non-biodegradable polyester such as Mylar®, poly (vinyl chloride), polystyrene, polyamides such as Nylon 6, listed in order of increasing WVTRs measured per 0.025 mm (mil) thickness and 645 cm² (100 in²) area at 37.4° C. (100° F.) and 90% RH (relative humidity), and biodegradable polymers which have WVTRs at least as high as that of LDPE, typically higher. Commonly available polymers have WVTRs which range from about 1.5 gm/24 hr for LDPE, to 8 gm/24 hr for Nylon 6, measured per 0.025 mm (1 mil) thickness and 645 cm² (100 in²) area at 37.4° C. (100° F) and 90% RH; even higher WVTRs are obtained with biodegradable polyesters. "Low density" PE typically has a density less than 0.943 g/cc.

Preferred biodegradable polymer films include star ε-caprolactone, and commercially available films such as linear ε-caprolactone (PCL) (from Union Carbide as PCL TONE 787); poly(hydroxybutyrate-co-valerate) (PHBV), containing 8, 16 and 24% valerate (from Imperial Chemical Industries (Zeneca), Billingham, UK; uncoated- and nitrocellulose-coated cellophane films (from DuPont, Wilmington, Del.); crosslinked chitosan (Protan Laboratories, Redmond, Was.) produced by reaction with epichlorohydrin; starch/ ethylene vinyl alcohol (St/EVOH) blend films and pure EVOH film (38 mole percent ethylene) (from Novamont, Novara, Italy and EVALCo, Lisle, Ill., respectively); and polycaprolactone (PCL), molecular weight about 80,000 Daltons (from Union Carbide, Bound Brook, N.J.).

Less favored non-biodegradable films include polycarbonate, polyurethane and polybutene-1. The choice of film depends upon the strength and flexibility requirements of the container in which the steel or cast iron objects are to be shipped, the length and degree of protection to be afforded, both from acid gases in the environment and from rough handling, the humidity of the particular environment in which the package is to be stored, and economic considerations. Most preferred films which are permeable to vapors of the active ingredients, include LDPE, PP, copolymers of two or more lower $C_2$-$C_8$ olefins, copolymers of a lower $C_2$-$C_8$ olefin and ethylene/vinyl alcohol, and ε-caprolactone, both linear and star; such films are also chosen where a high degree of flexibility is required. Containers with relatively rigid, light-permeable and thin sidewalls, less than 0.25 mm (10 mils), with from 0.01 to 1 phr (parts per hundred parts by weight of polymer) of each VCI active ingredient are preferably formed of polystyrene or polyester. Additives such as glass fibers may be used to reinforce the film, and a processing aid such as a plasticizer or processing oil, may optionally be included; a colorant, deodorant or scent, inert filler, and any other conventional additive, may also be added so long as the amount of the additive does not adversely affect the transparency of the film or its physical properties, unless deliberately required to do so. It will be evident that, if transparency may be compromised, an additive may be added in a higher concentration so long as it does not adversely affect the desirable physical properties of the substrate.

In a preferred embodiment, sodium nitrite and interceptor are ground or otherwise comminuted with an inorganic dispersant, preferably fumed silica or calcium carbonate, having a hardness greater than that of sodium nitrite until the solid ingredients are in the desired size range smaller than 53 µm. The primary particle size of sodium nitrite is in the range from about 1 to 44 µm, and its hardness is about 2 Mohs. The calcium carbonate preferably has a loose bulk density about 0.6 g/cm³, density of about 2.7 g/cm³ and hardness of about 3 Mohs. Fumed silica preferably has a primary particle size in the range smaller than 1 µm, such as is commercially available as Cab-O-Sil® from Cabot Corp. The powders are then mixed with a finely divided 2,4,6-tri-substituted phenol typically commercially available in the size range from about 1.18 mm to 710 µm (16 to 25 mesh Standard Test Sieves) which liquefy during extrusion of the film.

Representative phenols are: 2,6-di-t-butyl-4-methylphenol; 2,2'-methylene-bis(4-methyl-6-t-butylphenol); 1,1,3-tris(2'-methyl-4'-hydroxy-5'-t-butylphenyl)butane; 1,3,5-tris (3',5'-di-t-butyl-4'-hydroxybenzl)-2,4,6-trimethylbenzene; tris((3-(3',5'-di-t-butyl-4'hydroxybenzyl)2'acetoxyethyl)) isocyanurate; and, pentaerythrityl-tetrakis(3,5-di-t-butyl-4-hydroxyphenylpropionate).

Some of the above and other phenols are commercially available as Irganox® antioxidants identified by the numerals 245, CAS No. 36443-68-2; 259, CAS No. 35074-77-2; 565, CAS No. 991-84-4; 1010, CAS No. 6683-19-8; 1035, CAS No. 4184-35-9; 1076, CAS No. 2082-79-3; 1098, CAS No. 23128-74-7; 1135 CAS No. 125463-61-0; 1141, CAS No. 134701-20-5/2082-79-3; 1330, CAS No. 1709-70-2; and, 3114, CAS No. 27676-62-6.

The mixed powders are then dispersed in finely divided polymer, typically LDPE particles in a blender, then fed into the hopper of an extruder, extruded into a thin rod and pelletized into pellets in the size range from about 3 mm (0.125") to 9 mm (0.375") under conditions well known in the art.

To make the VCI-containing film, a predetermined amount of the pellets, sufficient to provide the desired concentration of VCI ingredients in the film, in turn, are homogeneously dispersed with more LDPE powder in a blender, and the mixture fed to the hopper of a conventional film extruder to extrude the finished film in the desired thickness containing the above-specified concentrations of the active VCI ingredients. Extrusion of the film is conventional, and is well known in the art.

Because a VCI-containing capsule does not enclose the metal object to be protected but only macrogranules or pellets of polymer containing the VCIs in high concentration, stated above, the walls of the capsule need not be transparent, though they preferably are, as long as at least one wall is vapor-permeable. Vapors of the VCI ingredients, specifically mostly sodium nitrite and BHT, gradually permeate through the pellets and into the space surrounding the capsule.

In one embodiment, a capsule comprises a short length of extruded cylindrical tubing of a lower PO less than 8 mil thick; cylindrical tubing may have an inner diameter in the range from about 5 mm (0.2") to about 12.5 mm (0.5"), into which a predetermined amount of pellets containing VCI ingredients is placed. The open ends of the tubing are then plugged with open-cell foam of an essentially non-hydrolyzable polymer. With the macrogranules of concentrate in the capsule, its open cell structure facilitates permeation of vapors of VCI ingredients through the pores of the foam into the space surrounding the capsule. The foam is preferably of a lower olefin, e.g. PE or PP, or of a polyurethane or polyester, most preferably one commercially available as "charcoal ester foam" from Burnett Foam Co.

In another embodiment, a capsule comprises a hollow parallelepiped of open-cell foam into which hollow a predetermined amount of pellets containing VCI ingredients is placed so that vapors of VCI ingredients may permeate through the foam into the space surrounding the capsule. A convenient way of making such a capsule is to have a relatively rigid rectangular parallelepiped wire framework with all six open spaces defined by struts of copper wire. Appropriately sized rectangular pieces of foam are pressed or otherwise secured within each open space to form a foam parallelepiped; the last foam piece is secured in the only open face after the desired amount of pellets is placed inside the hollow parallelepiped.

In still another embodiment, a capsule comprises a rectangular hollow parallelepiped of thin-walled PO film less than 0.20 mm (8 mil) thick, into which hollow a predetermined amount of pellets containing VCI ingredients is placed so that vapors of VCI ingredients may permeate through the film into the space surrounding the capsule. A convenient way of doing so is to extrude a rectangular tube of polymer from which a small section is cut, long enough to provide space to contain the pellets to be placed within the section. A piece of foam large enough to fit into one end is cut and pressed into one end of the section, and preferably adhesively secured therein. The pellets, or VCI ingredients, are placed within the hollow section; then another piece of foam is pressed into the remaining open end of the section to releasably seal the VCIs within it.

In accordance with the test procedure set forth in ASTM E 96, a comparison of the WVTRs is obtained with PE film and PE-VCI film of this invention; each of the films is extruded in a thickness of about 0.1 mm (4 mils) by first making a concentrate in a LDPE such as LDPE DuPont 20-6064, or linear low density LLDPE Dowlex 2535, or Microthene® FE 532 ethylene/vinyl acetate copolymer, then diluting a portion of the concentrate in a diluent polymer such as LDPE, Dowlex 2045 or Dowattane 4203, and melt-forming the mixture. Because the concentration of copolymer in the diluted thermoformed polymer is less than 7%, the finished film in which the VCI ingredients are dispersed is referred to as "PE-VCI film". "Plain PE film" is purchased LDPE film, such as of Equistar 940-094 believed to contain less than 100 ppm of BHT.

In an illustrative example, first, a 45.45 Kg (100 lb) lot of pellets is made with VCI ingredients in the following amounts:

| Sodium nitrite | 23.474% |
| --- | --- |
| Fumed silica | 00.726% |
| Interceptor | 02.0% |
| BHT[1] | 04.5% |
| Colorant | 00.22% |
| Total ingredients | 30.92% |

The remaining 31.4 Kg (69.08 lb) is Microthene FE 532
[1] 2,6-t-butyl-4-methyl phenol (BHT)

The foregoing ingredients and copolymer are mixed and extruded as a rod of arbitrary length, then pelletized to form the concentrate. The choice of copolymer derived from a search for a relatively low-melting polymer which is readily miscible in LDPE. The pellets are loaded into capsules, if these are desired.

When the foregoing ingredients are to be incorporated into film, some or all of the pellets are mixed with diluent LDPE (or other polymer in which the concentrate is miscible), then extruded. To extrude film tailored to protect ferrous metal objects for at least one year under cyclic temperature conditions in the range from 0° C. to 50° C. and 95% RH, 13.63 Kg (30 lb) of pellets of the foregoing concentrate are blended with 440.9 Kg (970 lb) of LDPE to extrude a batch of 1000 lb of PE-VCI film. The finished VCI-film, 0.1 mm (4 mils) thick, has ingredients in the following amounts:

| Sodium nitrite | 0.712% |
| --- | --- |
| Fumed silica | 0.02% |
| Interceptor | 0.06% |
| BHT | 0.135% |

If protection is desired for as long as ten years under humid conditions in an atmosphere contaminated with acidic gases, the 0.1 mm thick film may contain as much as 3.5% sodium nitrite, 0.1% fumed silica, 0.3% sodium disilicate, and 0.675% BHT. However, the transparency of the film will likely be compromised. A better alternative than having the high concentration in thin (0.1 mm) film is to use a lower concentration but thicker (1 mm) film; the rate of exhaustion of the active ingredients will be more uniform, as will be the protection afforded, if the thickness of the 10-year film is 1 mm and the concentration of ingredients is the same as in 0.1 mm.

Comparison of WVTRs of Plain PE Film and PE-VCI Film:

Samples of each film having concentrations of 0.06% zinc oxide and 0.06% sodium disilicate with the other ingredients present in amounts shown above, are compared. The samples are cut to fit over cups, each with an exteriorly threaded opening 7.62 cm (3") in diameter. Five samples are cut from films of varying thicknesses in the range from about 0.0875 mm (3.5 mil) to 0.105 mm (4.2 mil) thick and the readings for the five are averaged. The cups are each filled with identical weights of calcium chloride and each sample is secured on a cup with an internally threaded cap which is screwed on to seal the material within each cup. The cups are then placed in an oven having an atmosphere at a relative humidity in the range form 90-95% and at a temperature of 37.2° C. (100° F.). The cups are removed from the oven at intervals and weighed to determine the average weight gain (difference in weights before and after), and average WVTR of each as follows:

TABLE I

Comparison of WVTRs

| Film | After 68 hr | After 118 hr |
| --- | --- | --- |
| Plain PE | 0.3552 gm/100 in$^2$/24 hr | 0.3638 gm/100 in$^2$/24 hr |
| PE-VCI | 0.3456 gm/100 in$^2$/24 hr | 0.3465 gm/100 in$^2$/24 hr |

Substantially the same results are obtained with zinc oxide and sodium disilicate. From the foregoing it is evident that there is essentially no significant difference in the WVTRs of the two films after 68 hr irrespective of whether the interceptor is zinc oxide or sodium disilicate. Analogous results are obtained in a comparison of plain PE with a PE-VCI film of the '912 patent. Since there is no evident difference there was no reason to expect that a silicate of sodium would provide better corrosion protection than the '912 ingredients, over a long term of one year; and no reason to expect that either zinc oxide or sodium disilicate would provide an interceptor function.

Comparison of Effectiveness of VCIs in Film:

A qualitative comparison of the effectiveness of the VCIs in PE film strips which are spaced-apart from a metal coupon referred to as a "button", is determined by U.S. Federal Test Method Standard 101C, Method 4031 titled "Corrosion Inhibiting Ability of VCI Vapors". A numerical value of 1 is accorded a typical unprotected mild steel button ("control") which is heavily corroded because plain PE' film provides very little protection. The test is carried out as follows:

Preparing Metal Buttons:

QQ-S-698 mild steel buttons conforming to Federal Test Method STD No. 101C are polished on a lathe, first, with 240 grit silicon carbide paper, then with 400 grit aluminum oxide paper. Polishing both the face and the sides of the coupon allows for more consistent test results. Each button has a diameter of 15.9 mm (0.625")×9.5 mm (0.375") deep.

Test buttons are cleaned in solvent baths; first by immersing in hot mineral spirits (rule 66). Any residues that may be left from the sandpapers are removed at this time using sterile cotton swabs. The steel buttons are then placed in a bath of boiling methanol 95%. The buttons are removed one at a time and dried with hot air.

Preparing the Test Assembly

Strips of film 2.54 cm (1")×15.24 cm (6")×0.0875 mm (3.5 mil) thick are attached to the inner surface of the lid threadedly secured to the 6 cm (2.375") mouth of a glass quart jar with 3-M® Scotch Tape. The strips are oppositely disposed relative to each other, on either side of a cylindrical tube which is inserted through the lid of each jar, and spaced-apart from it; the tube has a rubber holder at one end into which a button is inserted. The strips are made using identical procedures, that is, first making a concentrate with Microthene FE 532, then diluting the concentrate in LDPE. Multiple jars (five) are typically prepared for each VCI formulation so that an average reading may be recorded. A first set of 5 jars uses PE film strips 0.0875 mm (3.5 mil) thick which contain active ingredients sodium nitrite, BHT and sodium disilicate in the proportions indicated above as the VCI combination, and fumed silica, together present in a concentration of about 0.05 phr PE. A second set of 5 jars uses PE film strips 0.0875 mm thick which contain added sodium nitrite and BHT (no interceptor) present in the same proportions as above, and fumed silica, together present in the same concentration (500 ppm). A third set of 5 jars uses plain PE film strips 0.875 mm thick, with no added ingredients.

The Test:

A steel button is inserted into each rubber holder of the test apparatus without any silicone or grease sealers. A glycerine-water solution, sp. gr. 1.18, is poured into the jar until the level is about 10 cm (4") from the lower surface of the button. The cover of each jar is tightly secured to each jar containing 10 ml of glycerin water to create a 90% relative humidity environment at room temperature. The jar is left to set for 20 hours, after which time each jar is placed in a bath of fairly warm water, about 50° C., for approximately 15-20 seconds, with the water line in the range from about one-third to one-half the height of the jar. This will help accelerate the rate of corrosion. After the test assemblies are removed from the water bath, the water retaining tube is immediately filled with ice water. The test assemblies will set for 3 hours at which time the test is complete and visual observations of the test results are made comparing the extent of corrosion on the "control" which is protected with film strips free of the VCIs used in the other strips. Severity of corrosion is recorded by numerals ranging from 1 to 10, the less the corrosion, the higher the numeral.

Observations indicate that the buttons in the first set of jars (protected by films containing the combination of VCIs including a silicate of sodium) are only very slightly corroded, 9 to 10 on a scale of 10, as indicated by barely visible brown spots; the buttons in the second set of jars (protected by films containing the combination of '912 ingredients) are more corroded, 7 to 8 on the scale of 10, than the buttons of the first set; while the control buttons in the third set of jars are heavily corroded, 1 to 2. This evidence qualitatively confirms that, films of this invention in spaced-apart relationship with the button being exposed, provide more effective corrosion protection. The results are summarized below:

| Film tested | Corrosion observed |
| --- | --- |
| PE with '912 ingredients | 7-8 |
| PE with sod. silicate + '912 ingredients | 9-10 |
| Plain PE | 1-2 |

It is evident that the level of protection afforded by the addition of sodium silicate is substantially higher than that afforded by the '912 ingredients alone. Analogous results are obtained when zinc oxide is substituted for the sodium silicate, in the same concentration.

Comparison of '912 VCI Film to Novel VCI Film Including Sodium Silicate:

The foregoing results are confirmed in more rigorous chamber tests which are run according to International Standard IEC 68-2-30 for basic environmental testing procedures specifying "Part 2: Test Db and guidance: Damp heat, cyclic (12+12-hour cycle)."

All film samples are 0.1 mm (4 mils) thick. The novel VCI ingredients, including interceptor, are present in amounts indicated above in the finished VCI-film, 0.1 mm (4 mils) thick, and are together present in a concentration of 1%. The '912 VCI ingredients (no interceptor) are present in the following amounts: sodium nitrite 5 0.742%; fumed silica 0.02%; BHT 0.165% in finished VCI-film, 0.1 mm (4 mils) thick, the ingredients together being present in a concentration of 1%. The amount (0.06%) which would have been contributed by the interceptor is divided equally between the sodium nitrite and the BHT.

Typically five samples, polished and dried rectangular mild 1010 steel plates, are each suspended within a box-shaped framework of nylon struts around which is tightly wrapped a sheet of film to be tested; each plate in each of five wrapped box-shaped frameworks is suspended in a chamber in which the temperature and atmosphere can be controlled according to any particular time-temperature cycle.

The test comprises one or more temperature cycles in which the relative humidity is maintained at a high level. Two variants of this cycle are given which are identical except for the temperature fall period; during this part of the cycle, variant 2 allows wider tolerances of relative humidity and the rate of temperature fall. The test is determined by the upper temperature of the cycle and the number of cycles.

The temperature in the chamber can be varied cyclically between 25±3° C. and the appropriate upper temperature specified with the tolerance and rate of change specified (as applicable). The conditions in the chamber are substantially uniform and air is continuously stirred at a rate necessary to maintain the specified conditions of temperature and humidity. The specimen being tested is subjected to radiant heat from the chamber conditioning process. Water used to maintain humidity in the chamber has a resistivity of not less than 500 Ωm; condensed water is continuously drained from the chamber and not reused, and precautions are taken to ensure that condensed water does not contact the specimen.

The severity of the test is defined by the combination of the upper temperature and the number of cycles as follows: upper temperature 55° C., lower temperature 25° C., 1 cycle per day.

A cycle is described as follows: The temperature of the chamber is maintained at 25° C. and 98% relative humidity for 6 hr. The temperature is then continuously raised to 55° C. in a period of about 3 hr and at a rate of about 10° C. per hour while the relative humidity is 95%; this temperature is maintained for 9 hr, during which period the relative humidity is 93% except for the first and last 15 min, when it is between 90% and 100%.

The temperature is then lowered to 25° C. within 2 hr at a rate of about 15° C. per hour, and this lower temperature is maintained at a relative humidity of not less than 98% until the 24 hr is completed (4 hr).

The results are as follows:

Visible corrosion occurred in samples protected by film which contained the '912 ingredients, after an average of 25 cycles.

There was no visible corrosion in samples protected by film which contained the combination of VCI ingredients of this invention, after 30 cycles. The results are substantially the same whether the interceptor is sodium disilicate or zinc oxide. The test was discontinued after 30 cycles because the test showed a substantial and unexpectedly large improvement over the '912 VCI ingredients.

The foregoing results are confirmed in generally analogous tests run in accordance with a specification for the Federal Office for Military Technology and Procurement of the Republic of Germany, titled "TL-8135-0002, Edition 9, Technical Specification for Packaging Material—Corrosion Inhibiting Paper—VCI Paper. In such tests, corrosion which occurred in samples protected by film containing the '912 ingredients, present in the proportions indicated above and at a concentration of 1%, had stage 3 corrosion protection; corrosion in samples protected by film containing the combination of VCI ingredients of this invention, present in the proportions indicated above and at a concentration of 1%, had only stage 2 corrosion protection.

In a manner analogous to that described above, 25 parts of sodium disilicate are mixed with 75 parts of Microthene FE 532 copolymer, extruded and pelletized. A portion of the pellets are then diluted with a much larger amount of PE and extruded into 1 mm thick film so that the concentration of sodium disilicate in the PE film is 1% by weight.

The foregoing procedure is repeated with ZnO so that the concentration of zinc oxide in the film is 1% by weight.

A statistically significant number of strips (three) of each of the films is then tested for VCI activity in sealed jars according to Federal Test Method Std. No. 101 D, Method 4031.

Results: On a scale of 1 to 10, 1 being the most severe corrosion as seen in samples protected by plain PE film which contains less than 100 ppm of BHT, each of the films showed severe corrosion in the range from 1 to 2. This evidence indicates that neither sodium disilicate nor zinc oxide, by themselves, provide corrosion protection.

The foregoing procedure is repeated with sodium silicate and sodium phosphate as follows: 2.0% sodium disilicate, 4.0% sodium phosphate, 94% Microthene FE 532, to make the concentrate a portion of which was diluted with PE and extruded into 0.1 mm thick film in which the concentration of sodium silicate and sodium phosphate together in the film is 1%.

A statistically significant number of strips (three) of each of the films is then tested for VCI activity in sealed jars according to Fed Test Method Std. No. 101D, Method 4031.

Results: On a scale of 1 to 10, 1 being most severe corrosion in samples protected by the plain PE film which contains less than 100 ppm of BHT, each of the films showed severe corrosion in the range from 1 to 3. This evidence indicates that a combination of sodium disilicate and sodium phosphate provides essentially no corrosion protection.

Protection Against Sulfur Dioxide:

The following results are obtained in tests to determine the effectiveness of protection of the VCIs in the combination of this invention against corrosion due to sulfur dioxide. The tests are carried out with 1010 steel panels in 1 gallon glass jars which can be sealed with lids from which polished steel coupons. Each panel is wrapped in a film to be tested but spaced apart from the film, and the wrapped sample is suspended in ajar. All test films, except the plain PE, contained VCI ingredients in the amounts indicated in the finished VCI-film, 0.1 mm (4 mils) thick, the ingredients in some test films together being present in a concentration of 1%. In other finished test films the interceptor is sodium disilicate at 0.06% and in still others the interceptor is zinc oxide at 0.06%.

The following test procedure describes one cycle. Successive cycles are repeated by replacing the solutions in the chamber after each cycle. Each 24 hr cycle starting is repeated at a temperature of 50° C. for 16 hr in the chamber, and a temperature of 23° C. for 8 hr outside the chamber in an ambient atmosphere. The metal coupons are not unwrapped after each cycle, but visually inspected, because the film retained its transparency. Each metal coupon is sanded and polished, then immersed in methanol and dried.

Several metal coupons are individually wrapped and sealed in specific films to be tested and suspended from the inner surface of a lid to be used to seal the mouth of the jars.

30 ml of a test solution (1% $Na_2SO_4$+1% $NH_4Cl$ in deionized water) is poured into a 50 ml plastic beaker and placed in each wide-mouth glass gallon jar to maintain an atmosphere of about 95% RH. Separately, place 0.04 g of $Na_2S_2O_3 \cdot 5H_2O$ in a 20 ml plastic beaker and place the beaker in the jar. Then add ml of 0.1N $H_2SO_4$ to the sodium hyposulfite in the beaker and immediately seal the mouth of the jar with the lid so that the wrapped metal coupons are vertically suspended within the jar and the film wrapping each coupon is exposed to the sulfur dioxide being generated. The concentration of sulfur dioxide is about 0.2% in the atmosphere in the jar.

The sealed jars are then placed in an oven at 50° C. for 16 hr after which the jars are removed and held at room temperature (23° C.) for 8 hr. This cycle is repeated and the metal coupons visually inspected until signs of surface alteration including pitting and staining due to corrosion are evident. On a scale of 1 to 10 where 10 represents a surface indistinguishable from the initial virgin finish, and 1 represents an average severe corrosion suffered by metal coupons wrapped in comparison PE film unprotected with VCIs, the following results were noted after 20 cycles:

| Plain PE film | PE film with novel VCIs |
|---|---|
| 1 | 9 |

The tests provide evidence that the novel VCIs including an interceptor in LDPE film offer approximately a five-fold improvement in protection against corrosion due to sulfur dioxide. Such corrosion is believed to be attributable to the sulfur dioxide being intercepted by the reaction products of the moistened VCI ingredients in the film. Substantially identical results are obtained whether the interceptor is sodium disilicate, or, zinc oxide, the other ingredients remaining the same. If desired, each interceptor may be used in a chosen proportion to provide a combination expected to yield analogous results.

In a manner analogous to that described above, 25 parts of sodium disilicate are mixed with 75 parts of Microthene FE 532 copolymer, extruded and pelletized. A portion of the pellets are then diluted with LDPE and extruded into 0.1 mm thick film so that the concentration of sodium disilicate in the film is about 1%.

The foregoing procedure is repeated with ZnO so that the concentration of zinc oxide in the film is about 1%.

A statistically significant number of strips (three) of each of the films is then tested in a manner analogous to that described for the novel VCI ingredients including interceptor Results: On a scale of 1 to 10, 1 being the most severe corrosion seen in samples protected by the plain PE film which contains less than 100 ppm of BHT (present in the PE as purchased), each of the films showed essentially no corrosion (a few spots) deemed to be about 9, indicating that either the silicate or the zinc oxide functions as an excellent interceptor for an acid gas such as sulfur dioxide.

While certain representative embodiments and details have been shown for the purpose of illustrating the invention, it will be apparent to those skilled in this art that various changes and modifications may be made therein without departing from the spirit or scope of the invention.

What is claimed is:

1. A concentrate adapted to be diluted with a biodegradable diluent polymer to produce a corrosion inhibiting composition effective to protect a ferrous metal surface against corrosion in a molecular-oxygen containing atmosphere containing in the range from 1 to 100 ppm of an acid gas at a relative humidity of 90% and 37.4° C. (100° F.), when the ferrous metal surface is exposed in generally spaced apart relationship with the composition in a sealed environment, the concentrate comprising a substantially non-hydrolyzable synthetic resinous polymer that is biodegradable having dispersed therein from 10 to about 40 parts of an interceptor comprising an alkali metal silicate, or zinc oxide, or both, from 10 to 40 parts of sodium nitrite, and from 10 to 40 parts of a 2,4,6-tri substituted phenol, in combination with an adjuvant present in less than 5 parts, provided that the resinous polymer has a water vapor transmission rate (WVTR) at least as high as that of low density polyethylene and is present in an amount of at least 40 parts in 100 parts of the concentrate.

2. The concentrate of claim 1, wherein said alkali metal silicate is sodium silicate, and wherein said concentrate biodegradable polymer comprises star ε-caprolactone, ε-caprolactone (ε-PCL); poly(hydroxybutyrate-co-valerate) (PHBV); uncoated- or nitrocellulose-coated cellophane film; crosslinked chitosan; starch/ethylene vinyl alcohol (St/VOH) blend film; pure ethylene vinyl alcohol film; or polycaprolactone (PCL).

3. The concentrate of claim 2, wherein said diluent biodegradable polymer comprises star ε-caprolactone, ε-caprolactone (ε-PCL); poly(hydroxybutyrate-co-valerate) (PHBV); uncoated- or nitrocellulose-coated cellophane film; crosslinked chitosan; starch/ethylene vinyl alcohol (St/VOH) blend film; pure ethylene vinyl alcohol film; or polycaprolactone (PCL).

4. The concentrate of claim 3, wherein the 2,4,6-tri-substituted phenol comprises 2,6-di-t-butyl-4-methylphenol; 2,2'-methylene-bis(4-methyl-6-t-butylphenol); 1,3,5-tri(3', 5'-di-t-butyl-4'-hydroxybenzyl)-2,4,6-trimethylbenzene; tris((3-(3',5'-di-t-butyl-4'hydroxybenzyl)-2'acetoxyethyl)) isocyanurate; or, pentaerythrityl-tetrakis(3,5-di-t-butyl-4-hydroxyphenylpropionate), or a combination thereof.

5. The concentrate of claim 4, wherein the adjuvant comprises fumed silica or calcium carbonate.

6. The concentrate of claim 2, wherein the interceptor and the sodium nitrite have a primary particle size, independently, in the range from about 1 to 53 microns and are substantially homogeneously dispersed in the polymer.

7. The concentrate of claim 1, wherein the particle size of said alkali metal silicate or said zinc oxide, independently, is from 1 to 45 microns, wherein the particle size of said sodium nitrite is from 1 to 45 microns.

8. The concentrate of claim 3, wherein the particle size of said alkali metal silicate or said zinc oxide, independently, is from 1 to 45 microns, wherein the particle size of said sodium nitrite is from 1 to 45 microns.

9. The concentrate of claim 5, wherein the particle size of said alkali metal silicate or said zinc oxide, independently, is from 1 to 45 microns, wherein the particle size of said sodium nitrite is from 1 to 45 microns, and wherein the particle size of said fumed silica or calcium carbonate is less than 1 micron.

10. A composition, comprising the concentrate of claim 1, and said biodegradable diluent polymer, said composition comprising:
from 0.01% to 2% by weight of each of said alkali metal silicates or said zinc oxide, or both;
from 0.01% to 2% by weight of said sodium nitrite; and
from 0.01% to 2% by weight of said trisubstituted phenol.

11. A composition, comprising the concentrate of claim 3, and said biodegradable diluent polymer, said composition comprising:
from 0.01% to 2% by weight of each of said alkali metal silicate, or said zinc oxide, or both;
from 0.01% to 2% by weight of said sodium nitrite; and
from 0.01% to 2% by weight of said trisubstituted phenol.

12. A composition, comprising the concentrate of claim 7, and said biodegradable diluent polymer, said composition comprising
from 0.01% to 2% by weight of each of said alkali metal silicate, or said zinc oxide, or both;
from 0.01% to 2% by weight of said sodium nitrite; and
from 0.01% to 2% by weight of said trisubstituted phenol.

13. A composition, comprising the concentrate of claim 9, and said biodegradable diluent polymer, said composition comprising
from 0.01% to 2% by weight of each of said alkali metal silicate or said zinc oxide or both;
from 0.01% to 2% by weight of said sodium nitrite;
from 0.01% to 2% by weight of said trisubstituted phenol; and
from about 0.01% to 1% by weight of said fumed silica or said calcium carbonate.

14. The concentrate of claim 2, wherein the 2,4,6-trisubstituted phenol comprises 2,6-di-t-butyl-4-methylphenol; 2,2'-methylene-bis(4-methyl-6-t-butylphenol); 1,3,5-tri (3',5'-di-t-butyl-4'-hydroxybenzyl)-2,4,6-trimethylbenzene; tris((3-(3',5'-di-t-butyl-4'hydroxybenzyl)-2'acetoxyethyl)) isocyanurate; or, pentaerythrityl-tetrakis(3,5-di-t-butyl-4hydroxyphenylpropionate), or combinations thereof, and
wherein the adjuvant comprises fumed silica and calcium carbonate.

15. A corrosion inhibiting composition effective to protect a ferrous metal surface against corrosion in a molecular-oxygen containing atmosphere containing in the range from 1 to 100 ppm of an acid gas at a relative humidity of 90% and 37.4° C. (100° F.), when the ferrous metal surface is exposed in generally spaced apart relationship with the composition in a sealed environment, the composition comprising: a substantially non-hydrolyzable synthetic resinous polymer that is a biodegradable polymer having dispersed therein from 0.01% to 2% by weight of each of an interceptor comprising an alkali metal silicate, or zinc oxide, or both, from 0.01% to 2% by weight of sodium nitrite, and from 0.01% to 2% by weight of a 2,4,6-trisubstituted phenol, and less than 1% by weight of an adjuvant, provided that the polymer has a water vapor transmission rate (WVTR) at least as high as that of low density polyethylene.

16. The corrosion inhibiting composition of claim 15, wherein said alkali metal silicate is sodium silicate, wherein said biodegradable polymer comprises a star ε-caprolactone, ε-caprolactone (ε-PCL); poly(hydroxybutyrate-co-valerate) (PHBV); uncoated- or nitrocellulose-coated cellophane film; crosslinked chitosan; starch/ethylene vinyl alcohol (St/ VOH) blend film; pure ethylene vinyl alcohol film; and polycaprolactone (PCL).

17. The corrosion inhibiting composition of claim 16, wherein said biodegradable polymer is a star ε-caprolactone, ε-caprolactone (ε-PCL), or poly-caprolactone (PCL).

18. The corrosion inhibiting composition of claim 16, wherein the adjuvant comprises fumed silica or calcium carbonate.

19. The corrosion inhibiting composition of claim 15, wherein the amount of each of said alkali metal silicate or said zinc oxide, or both, is from 0.05% to 1% by weight, wherein the amount of said sodium nitrite is from 0.05% to 1% by weight, wherein the amount of said trisubstituted phenol is from 0.05% to 1% by weight, and wherein the amount of said adjuvant is from 0.01% to 1% by weight.

20. The corrosion inhibiting composition of claim 18, wherein the amount of each of said alkali metal silicate or said zinc oxide, or both, is from 0.05% to 1% by weight, wherein the amount of said sodium nitrite is from 0.05% to 1% by weight, wherein the amount of said trisubstituted phenol is from 0.05% to 1% by weight, and wherein the amount of said adjuvant is from 0.01% to 1% by weight.

21. The corrosion inhibiting composition of claim 19, wherein the alkali metal silicate and said zinc oxide, independently, has a primary particle size of from about 1 to 53 microns and are substantially homogeneously dispersed in the polymer, wherein said sodium nitrite has a primary particle size of from about 1 to 53 microns and is substantially homogeneously dispersed in the polymer, and wherein said adjuvant has a particle size of less than 1 micron.

22. The corrosion inhibiting composition of claim 20, wherein the alkali metal silicate and said zinc oxide, independently, has a primary particle size of from about 1 to 53 microns and are substantially homogeneously dispersed in the polymer, wherein said sodium nitrite has a primary particle size of from about 1 to 53 microns and is substantially homogeneously dispersed in the polymer, and wherein the particle size of said fumed silica and said calcium carbonate, independently, is less than 1 micron.

23. A concentrate adapted to be diluted with a non-biodegradable polymer diluent to produce a corrosion inhibiting composition effective to protect a ferrous metal surface against corrosion in a molecular-oxygen containing atmosphere containing in the range from 1 to 100 ppm of an acid gas at a relative humidity of 90% and 37.4° C. (100° F.), when the ferrous metal surface is exposed in generally spaced apart relationship with the composition in a sealed environment, the concentrate comprising a substantially non-hydrolyzable synthetic resinous polymer that is non-biodegradable having dispersed therein from 10 to about 40 parts of an interceptor comprising an alkali metal silicate, or zinc oxide, or both, from 10 to 40 parts of sodium nitrite from 10 to 40 parts of, and a 2,4,6-tri substituted phenol, in combination with an adjuvant present in less than 5 parts, provided that the resinous polymer has a water vapor transmission rate (WVTR) at least as high as that of low density polyethylene and is present in an amount of at least 40 parts in 100 parts of the concentrate.

24. A concentrate of claim 23, wherein said alkali metal silicate is sodium silicate, and wherein said concentrate non-biodegradable polymer comprises low density polyethylene, polypropylene, copolymer of lower $C_2$-$C_8$ olefin, copolymer of lower $C_2$-$C_8$ olefin and ethylene/vinyl alcohol, ethylene/vinyl acetate, non-biodegradable polyester, polycarbonate, polyurethane, polybutene, poly(vinyl chloride), polystyrene, or polyamide.

25. The concentrate of claim 24, wherein said non-biodegradable diluent polymer comprises low density polyethylene, polypropylene, copolymer of lower $C_2$-$C_8$ olefin, copolymer of lower $C_2$-$C_8$ olefin and ethylene/vinyl alcohol, ethylene/vinyl acetate, non-biodegradable polyester, polycarbonate, polyurethane, polybutene, poly(vinyl chloride), polystyrene, or polyamide, wherein the adjuvant comprises fumed silica or calcium carbonate, and wherein the interceptor and the sodium nitrite have a primary particle size, independently, in the range from about 1 μm to 53 μm and are substantially homogeneously dispersed in the polymer.

26. A composition comprising the concentrate of claim 23, and said non-biodegradable diluent polymer, said composition comprising:
from 0.01% to 2% by weight of each of said alkali metal silicate or said zinc oxide, or both;
from 0.01% to 2% by weight of said sodium nitrite; and
from 0.01% to 2% by weight of said trisubstituted phenol.

27. A composition comprising the concentrate of claim 25, and said non-biodegradable diluent polymer, said composition comprising:
from 0.01% to 2% by weight of each of said alkali metal silicate, or said zinc oxide, or both;
from 0.01% to 2% by weight of said sodium nitrite; and
from 0.01% to 2% by weight of said trisubstituted phenol;
wherein said concentrate polymer is said non-biodegradable polymer.

28. The composition of claim 26, wherein the particle size of said alkali metal silicate or said zinc oxide, independently, is from 1 to 45 microns, wherein the particle size of said sodium nitrite is from 1 to 45 microns, and wherein the particle size of said adjuvant is less than 1 micron.

29. The composition of claim 27, wherein the particle size of said alkali metal silicate or said zinc oxide, independently, is from 1 to 45 microns, wherein the particle size of said sodium nitrite is from 1 to 45 microns, and wherein the particle size of said fumed silica or calcium carbonate is less than 1 micron.

30. A corrosion inhibiting composition effective to protect a ferrous metal surface against corrosion in a molecular-oxygen containing atmosphere containing in the range from 1 to 100 ppm of an acid gas at a relative humidity of 90% and 37.4° C. (100° F.), when the ferrous metal surface is exposed in generally spaced apart relationship with the composition in a sealed environment, the composition comprising: a substantially non-hydrolyzable synthetic resinous polymer that is a non-biodegradable polymer having dispersed therein from 0.01% to 2% by weight of each of an interceptor comprising an alkali metal silicate, or zinc oxide, or both, from 0.01% to 2% by weight of sodium nitrite, and from 0.01% to 2% by weight of a 2,4,6-trisubstituted phenol, and less than 1% by weight of an adjuvant, provided that the polymer has a water vapor transmission rate (WVTR) at least as high as that of low density polyethylene.

31. The corrosion inhibiting composition of claim 30, wherein said alkali metal silicate is sodium silicate, wherein said non-biodegradable polymer comprises low density polyethylene, polypropylene, copolymer of lower $C_2$-$C_8$ olefin, copolymer of lower $C_2$-$C_8$ olefin and ethylene/vinyl alcohol, ethylene/vinyl acetate, polycarbonate, polyurethane, polybutene, poly(vinyl chloride), polystyrene, or polyamide.

32. The corrosion inhibiting composition of claim 31, wherein said non-biodegradable polymer is low density polyethylene, or ethylene/vinyl acetate copolymer.

33. The corrosion inhibiting composition of claim 31, wherein the adjuvant comprises fumed silica or calcium carbonate.

34. The corrosion inhibiting composition of claim 30, wherein the amount of each of said alkali metal silicate or said zinc oxide, or both, is from 0.05% to 1% by weight, wherein the amount of said sodium nitrite is from 0.05% to 1% by weight, wherein the amount of said trisubstituted phenol is from 0.05% to 1% by weight, and wherein the amount of said adjuvant is from 0.01% to 1% by weight.

35. The corrosion inhibiting composition of claim 33, wherein the amount of each of said alkali metal silicate or said zinc oxide, or both, is from 0.05% to 1% by weight, wherein the amount of said sodium nitrite is from 0.05% to 1% by weight, wherein the amount of said trisubstituted phenol is from 0.05% to 1% by weight, and wherein the amount of said adjuvant is from 0.05% to 1% by weight.

36. The corrosion inhibiting composition of claim 34, wherein the alkali metal silicate and said zinc oxide, independently, has a primary particle size of from about 1 to 53 microns and are substantially homogeneously dispersed in the polymer, wherein said sodium nitrite has a primary particle size of from about 1 to 53 microns and is substantially homogeneously dispersed in the polymer, and wherein said adjuvant has a particle size of less than 1 micron.

37. The corrosion inhibiting composition of claim 35, wherein the alkali metal silicate and said zinc oxide, independently, has a primary particle size of from about 1 to 53 microns and are substantially homogeneously dispersed in the polymer, wherein said sodium nitrite has a primary particle size of from about 1 to 53 microns and is substantially homogeneously dispersed in the polymer, and wherein said adjuvant has a particle size of less than 1 micron.

* * * * *

UNITED STATES PATENT AND TRADEMARK OFFICE
CERTIFICATE OF CORRECTION

| | | |
|---|---|---|
| PATENT NO. | : 7,270,775 B2 | Page 1 of 1 |
| APPLICATION NO. | : 10/676752 | |
| DATED | : September 18, 2007 | |
| INVENTOR(S) | : Donald Alfons Kubik et al. | |

It is certified that error appears in the above-identified patent and that said Letters Patent is hereby corrected as shown below:

Column 19,

Claim 27, line 23 and 24, after "phenol" delete the words "; wherein said concentrate polymer is said non-biodegradable polymer"

Signed and Sealed this

Fifth Day of February, 2008

JON W. DUDAS
*Director of the United States Patent and Trademark Office*